Oct. 12, 1971  HANS-JOACHIM KLEINSCHMIDT  3,611,751

UNIVERSAL JOINT SPIDER

Filed Sept. 30, 1969

United States Patent Office 3,611,751
Patented Oct. 12, 1971

3,611,751
UNIVERSAL JOINT SPIDER
Hans-Joachim Kleinschmidt, Essen, Germany, assignor to Gelenkwellenbau G.m.b.H., Essen, Germany
Filed Sept. 30, 1969, Ser. No. 862,268
Claims priority, application Germany, Sept. 30, 1969,
G 67 51 246
Int. Cl. F16d 3/26
U.S. Cl. 64—17          3 Claims

ABSTRACT OF THE DISCLOSURE

Universal joint spider includes a core member, a plurality of journal pins extending from the core member in directions transverse to the rotary axis of the spider and received in respective bearing bushes insertable into the forks of a universal joint, the core member being formed with a recess serving as a lubricant chamber and communicating through respective lubricating ducts with a bearing chamber located between and defined by each of the journal pins and the respective bearing bush, and at least one closure member sealing the recess and comprising a cover portion covering the open end of the recess and a nose portion extending coaxially with the rotary axis of the spider from the cover portion to the inner closed end of the recess.

---

Figure 1:
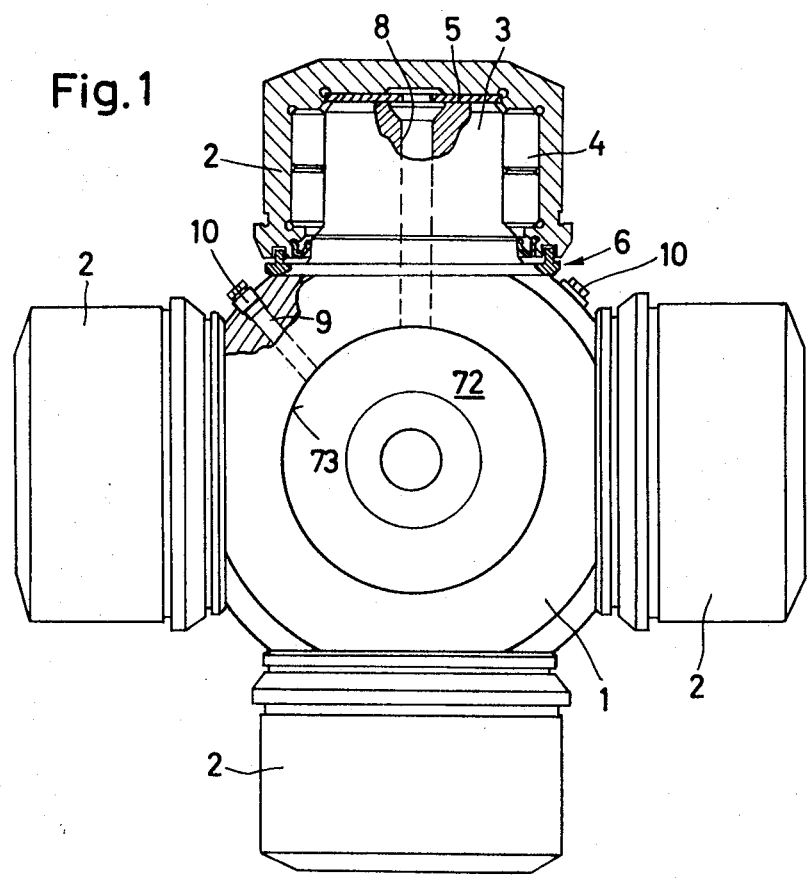

My invention relates to a universal joint spider having bearing bushes insertable into the forks of a universal joint and formed with a recess in the core member thereof serving as a lubricant chamber communicating through a respective lubricating duct with a bearing chamber located between the journal and the bearing bush and sealed by at least one closure member.

In a known universal joint spider of this general type, the recess is formed as a smooth-walled cavity having a center coinciding with the center of the universal joint spider. Lubricant is lost as the period of operation of the joint increases. The loss of lubricant is relatively great particularly for shafts operating at high rotary speeds. There can be no assurance of a uniform supply of lubricant to all journal bearings in the known universal joint spider if an insufficient amount of lubricant is available. This applies particularly at start-up and during slow speed operation because the lubricant residue always accumulates in the lowest part of the recess.

An object of my invention is to provide universal joint spider of the aforementioned type which assures a uniform supply of lubricant to all bearing positions at all operating conditions, even for a relatively great loss of lubricant.

With the foregoing and other objects in view, I provide in accordance with my invention, universal joint spider comprising a core member, a plurality of journal pins extending from the core member in directions transverse to the rotary axis of the spider and received in respective bearing bushes insertable into the forks of a universal joint, the core member being formed with a recess serving as a lubricant chamber and communicating through respective lubricating ducts with a bearing chamber located between and defined by each of the journal pins and the respective bearing bush, and at least one closure member sealing the lubricant chamber recess and comprising a cover portion covering the open end of the recess and a nose portion extending coaxially with the rotary axis of the spider from the cover portion to the inner closed end of the recess.

The lubricant residue remaining in the universal joint spider of the invention after a prolonged running period is displaced by the closure member nose portion from the center of the spider, i.e. the region of minimum centrifugal force, outwardly into regions of greater centrifugal force so that the small quantities of remaining lubricant are uniformly delivered to the journal bearings from the very instant that the universal joint spider begins to rotate.

In accordance with another feature and a preferred embodiment of my invention, the nose portion is integral with the cover portion of the closure member and is deep-drawn therefrom, the closure member being formed of plastic material.

Other features which are consideed as characteristic of the invention are set forth in the appended claims.

Although the invention is illustrated and described herein as embodied in universal joint spider, it is nevertheless not intended to be limited to the details shown, since various modifications and structural changes may be made therein without departing from the spirit of the invention and within the scope and range of equivalents of the claims.

Figure 2:
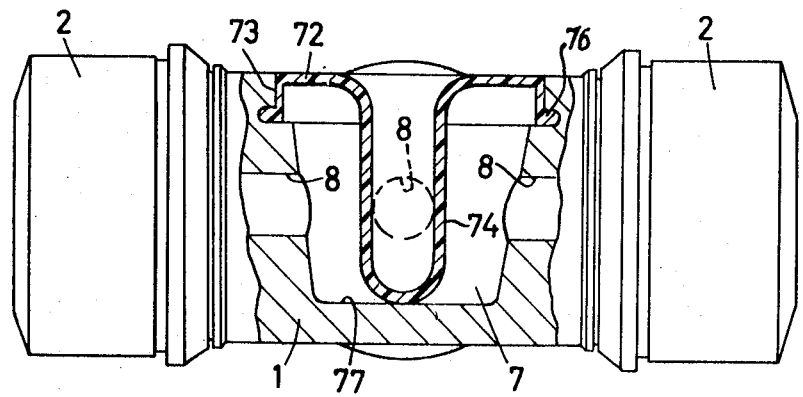

The construction and method of operation of the invention, however, together with additional objects and advantages thereof will be best understood from the following description of specific embodiments when read in connection with the accompanying drawings, in which:

FIG. 1 is an end view of a universal joint spider according to the invention, one of the bearing bushes and part of the core of the spider being shown in section; and FIG. 2 is a bottom plan view of the universal joint spider of FIG. 1, most of the core thereof being shown in section.

Referring now to the drawing, there is shown a universal joint spider constructed in accordance with my invention and having a core portion 1 from which four journal pins 3 extend, respectively, into four cup-shaped bearing bushes 2. The journal pins 3 are journalled in the bearing bushes 2, respectively, by a double row radial roller bearing 4. The bearing bushes 2 are insertable in a conventional manner into the forks of a universal joint (not shown). A thrust washer 5 is provided between the closed end of each bearing bush 2 and the end face of the respective bearing pin 3 for fixing the axial position of the latter. The thrust washer 5 has a center hole to permit the passage of lubricant to both sides thereof. The roller bearing 4 is sealed at the open end of the bearing bush 2 by a sealing member 6.

The core portion 1 of the universal joint spider of my invention is formed with a recess 7 which extends coaxially to the axis of rotation of the spider (FIG. 2). Four bores 8, extending inwardly from the end faces of the bearing pins 3 and coaxially with the respective longitudinal axes thereof, terminate in the recess 7. Transverse bores 9, through which the recess is filled with lubricant and which are sealingly closed with respective plugs 10, also extend, from respective locations on the exterior of the core 1 and between the bearing bushes 2 (FIG. 1), into the recess 7.

The recess 7 is closed by a sealing closure member 72 of suitable plastic material which is accommodated in an annular recess 73 surrounding the external open end of the recess 7.

According to FIG. 2, the peripheral surface at the external or open end of the recess 73 is provided with an annular groove in which a bead 76 is adapted to engage sealingly, the bead being formed on the free end of a cylindrical wall cover portion of the closure member 72 which yields resiliently in the radial direction.

In the center of the cover 72 there is provided an inwardly projecting nose portion 74 which extends to the inner end 77 of the recess 7 to ensure a uniform supply of lubricant to the journal pin bearings, even when only a small quantity of lubricant is provided and operation is at low rotary speeds. As can be seen from FIG. 2, the nose portion 74 is hollow, and the closure member 72 has the general form of a baby-bottle nipple.

I claim:
1. Universal joint spider comprising a core member, a plurality of journal pins extending from said core member in directions transverse to the rotary axis of the spider and received in respective bearing bushes insertable into the forks of a universal joint, said core member being formed with a recess serving as a lubricant chamber and communicating through respective lubricating ducts with a bearing chamber located between and defined by each of said journal pins and the respective bearing bush, and at least one closure member sealing said lubricant chamber recess and comprising a cover portion covering the open end of said recess and a nose portion extending coaxially with the rotary axis of the spider from said cover portion to the inner closed end of said recess, said nose portion being integral with said cover portion and being deep-drawn therefrom.
2. Universal joint spider according to claim 1, wherein said closure member is formed of plastic material.
3. Universal joint spider according to claim 1, wherein said nose member is hollow, and said closure member is in the general form of a baby-bottle nipple.

References Cited
UNITED STATES PATENTS 3,353,374   10/1967   Berthenhoff _____ 64—17 A MARK M. NEUMAN, Primary Examiner R. HEALD, Assistant Examiner

PO-1050
(5/69)

UNITED STATES PATENT OFFICE
CERTIFICATE OF CORRECTION

Patent No. 3,611,751  Dated October 12, 1971

Inventor(s) Hans-Joachim Kleinschmidt

It is certified that error appears in the above-identified patent and that said Letters Patent are hereby corrected as shown below:

In the heading to the printed specification, the German priority date should read --September 30, 1968--

Signed and sealed this 29th day of February 1972.

(SEAL)
Attest:

EDWARD M. FLETCHER, JR.
Attesting Officer

ROBERT GOTTSCHALK
Commissioner of Patents